(12) United States Patent
Bunker

(10) Patent No.: US 6,484,852 B1
(45) Date of Patent: Nov. 26, 2002

(54) MULTIPLE DISK BRAKE SYSTEM WITH INTEGRATED PARKING BRAKE

(75) Inventor: Kenneth James Bunker, Rearsby (GB)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/762,830
(22) PCT Filed: Aug. 2, 1999
(86) PCT No.: PCT/GB99/02535
§ 371 (c)(1), (2), (4) Date: Feb. 14, 2001
(87) PCT Pub. No.: WO00/09905
PCT Pub. Date: Feb. 24, 2000

(30) Foreign Application Priority Data

Aug. 15, 1998 (GB) .............................................. 9817786

(51) Int. Cl.$^7$ .............................................. F16D 63/00
(52) U.S. Cl. .................. 188/70 R; 188/18 A; 188/71.5
(58) Field of Search .............................. 188/70 R, 18 A, 188/71.5

(56) References Cited

U.S. PATENT DOCUMENTS

| | | |
|---|---|---|
| 3,146,860 A | 9/1964 | Wilson |
| 3,837,420 A | 9/1974 | Kobelt |
| 3,844,385 A | 10/1974 | Szekely |
| 4,576,255 A | 3/1986 | Mery et al. |
| 5,385,216 A * | 1/1995 | Kulzzycki .................. 188/70 R |
| 5,402,865 A | 4/1995 | Harker |
| 5,715,916 A * | 2/1998 | Fanelli et al. ........... 188/106 A |
| 6,056,089 A * | 5/2000 | Karlsson et al. ........... 188/71.6 |
| 6,244,391 B1 * | 6/2001 | Bunker ..................... 188/18 A |

FOREIGN PATENT DOCUMENTS

| | | |
|---|---|---|
| AU | 7250894 | 1/1995 |
| AU | 676073 | 2/1997 |
| DE | 2319201 | 11/1973 |
| DE | 2430060 | 1/1976 |
| DE | 69403477 | 7/1997 |
| DE | 69403477 | 10/1997 |
| EP | 0705189 | 4/1996 |
| GB | 1402673 | 8/1975 |
| GB | 2031538 A | 4/1980 |
| JP | 51008465 | 1/1976 |
| JP | 8508082 | 8/1996 |
| WO | WO 95/01271 | 1/1995 |

* cited by examiner

Primary Examiner—Matthew C. Graham
(74) Attorney, Agent, or Firm—Reising, Ethingtor, Barnes, Kisselle, Learman & McCulloch P.C.

(57) ABSTRACT

A brake system (10) comprises a disc brake (30) and a drum brake (50), and a hub (20). The hub (20) comprises a mounting portion (20a) generally having the shape of a hollow cylinder. The disc brake (30) comprises a disc (32) mounted on our outer surface of said portion (20c) of the hub for rotation with the hub, the disc (32) also being mounted for axial sliding movement on the hub (20). The drum brake (50) comprises frictional material shoes (56) which are moveable into engagement with an internal cylindrical surface (20e) of said mounting portion (20c) of the hub (20) to act as a parking brake.

4 Claims, 3 Drawing Sheets

MULTIPLE DISK BRAKE SYSTEM WITH INTEGRATED PARKING BRAKE

This invention is concerned with a brake system eg for a vehicle.

Many vehicles are equipped with disc brakes to fulfil the primary braking function of stopping or slowing the vehicle. Such disc brakes are often operated by a foot pedal and hence do not operate in the absence of the driver. For this reason, the vehicles are equipped with a parking brake which can be held in a "brakes on" condition in the absence of the driver, the parking brake serving to prevent the vehicle from moving from rest. Conventionally, such parking brakes are of the drum brake type, comprising a hollow cylindrical drum and two "shoes" comprising friction material. The shoes are mechanically-operated to engage the inner cylindrical surface of the drum with a braking force. Thus, the overall brake system has a considerable weight.

It is common for the disc of a disc brake to be the so-called "top-hat" type comprising an annular inner portion which is bolted to a hub, a joining portion which is generally cylindrical and extends axially of the hub, and an annular friction material-engaging portion joined to the inner portion by the joining portion. In order to save weight, the interior surface of the joining portion is often utilised as the drum of a drum type parking brake, thereby eliminating the necessity for a separate drum. However, where the disc is not of the top-hat type, this solution is not available.

GB 2031538 A, in connection with FIG. 4 thereof, discloses a brake of the enclosed type suitable for use in the agricultural or construction industries. This brake has a hollow cylindrical hub portion of relatively small diameter which provides a mounting for a disc of a disc brake. Axially spaced from but integral with said hub portion is a further hollow cylindrical hub portion of much greater diameter which serves as the drum of a drum parking brake. Thus, the disc mounting and the drum are provided by different portions of the hub.

In WO 98/25804, a disc brake is described in which at least one disc is mounted on a hub. The disc is mounted on the hub by means of mounting means arranged so that the hub and the disc rotate about the central axis of the hub as a unit but the disc can perform axial sliding movement on the hub. The specific example given in WO 98/25804 has two discs mounted on the same hub, both being slidable axially. The brake also comprises a piston and cylinder assembly having its cylinder fixed relative to a suspension link of a vehicle, the cylinder being integrally formed with the link. The system also comprises a caliper fixed relative to the cylinder, the caliper providing supports for friction pads of the system, including pads between the two discs. The pad furthest from the assembly is fixed to the caliper but the remaining pads are slidably mounted thereon. When the piston and cylinder assembly is operated, the pad operated upon by the assembly and the pads between the discs slide on the caliper, and the discs slide on the hub until each disc is engaged on both sides by a pad.

The disc brake of WO 98/25804 operates on a hub which comprises a mounting portion on which the discs are mounted. The mounting portion is generally in the shape of a hollow cylinder, the discs being mounted on the outer cylindrical surface thereof. The disc brake is for a driven hub and the interior of the mounting portion is occupied by a connection between the hub and a drive shaft.

It is an object of the present invention to provide a brake system of the general type disclosed in WO 98/25804, the system being of reduced weight.

The invention provides a brake system comprising a disc brake, a drum brake, and a hub arranged to rotate about a central axis thereof, the hub comprising a mounting portion generally having the shape of a hollow cylinder centred on said axis, the disc brake comprising a disc mounted on an outer surface of said mounting portion of the hub for rotation with the hub, the disc also being mounted for axial sliding movement on the hub, characterised in that the drum brake comprises friction material shoes which are moveable into engagement with an internal cylindrical surface of said mounting portion of the hub to act as a parking brake.

In a brake system according to the invention, the same hollow cylindrical portion of the hub is utilised both as the mounting portion of the disc of a disc brake and also as the drum of a drum brake, thereby avoiding the necessity for a separate drum or drum portion, giving a lighter, simpler and more compact brake.

There now follows a detailed description, to be read with reference to the accompanying drawings, of a brake system which is illustrative of the invention.

IN THE DRAWINGS

Figure 1:
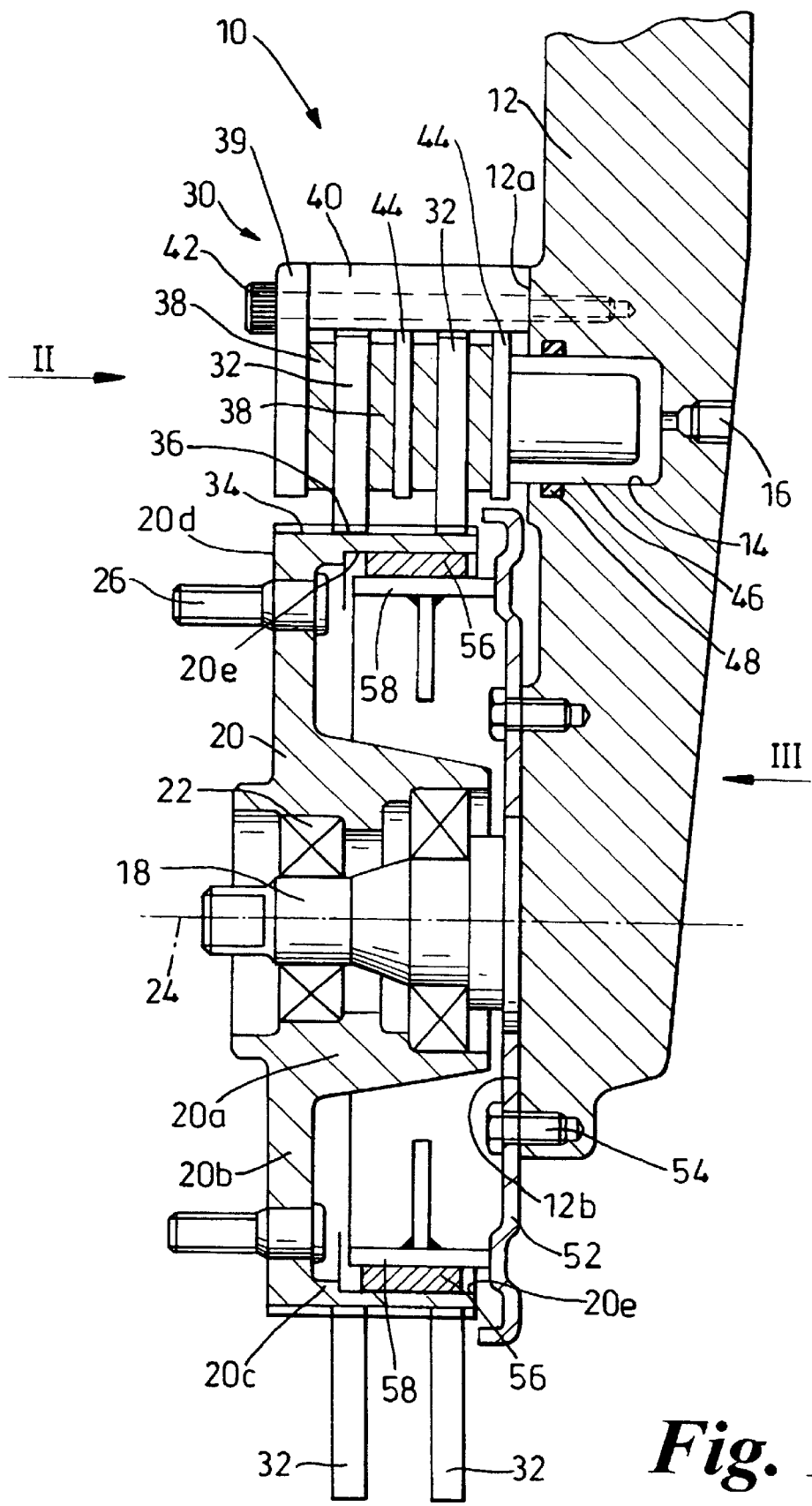
FIG. 1 is a vertical cross-sectional view taken through the illustrative brake system.

The illustrative brake system 10 shown in the drawings is mounted on a suspension link 12 of a vehicle. On one side thereof, the link 12 has an upper vertical mounting surface 12a and a lower vertical mounting surface 12b (see FIG. 1). A cylindrical recess 14 is formed in the link 12 and has an opening through the surface 12a. The recess 14 has a connection between its bottom surface and a connecting point 16 in the link 12 for a hydraulic pipe (not shown) so that hydraulic fluid under pressure can be delivered to the recess 14 so that (as further described below) the recess 14 can be utilised as the cylinder of a hydraulically-operated piston and cylinder assembly of a disc brake of the system 10. The link 12 also supports a stub axle 18 which extends horizontally from the lower mounting surface 12b.

The illustrative brake system 10 also comprises a hub 20 which is mounted on the stub axle 18 on bearings 22. The hub 20 is mounted for rotation about a central horizontal axis 24 thereof. The hub 20 comprises a central portion 20a which houses the bearings 22, an annular flange portion 20b which extends vertically at one end of the portion 20a, and a mounting portion 20c generally having the shape of a hollow cylinder centred on the axis 24. The flange portion 20b provides an annular vertical mounting surface 20d to which a wheel (not shown) can be bolted by bolts 26 in a conventional manner. The mounting portion 20c is joined to an outer peripheral portion of the flange portion 20b and extends around the central portion 20a.

The illustrative brake system 10 also comprises a disc brake 30 which is generally of the type disclosed in WO 98/25804. The brake 30 comprises two discs 32 which are in the form of annular plates formed of steel. The discs 32 are mounted on the outer surface of mounting portion 20c of the hub 20 so that the discs 32 rotate with the hub 20 about the axis 24 and so that the discs 32 can perform axial sliding movement on the hub 20. Specifically, grooves 34 are formed in the external surface of the mounting portion 20c, each groove 34 extending parallel to the axis 24, and teeth 36 project from the discs 32 into the grooves 34. The teeth 36 serve to transmit rotational forces between the discs 32 and the hub 20 and can slide axially along the grooves 34. As disclosed in WO 98/25804, leaf springs (not shown) provide resilient means acting between the hub 20 and the discs 32 to apply radial force to control the movement of the discs 32.

Figure 2:
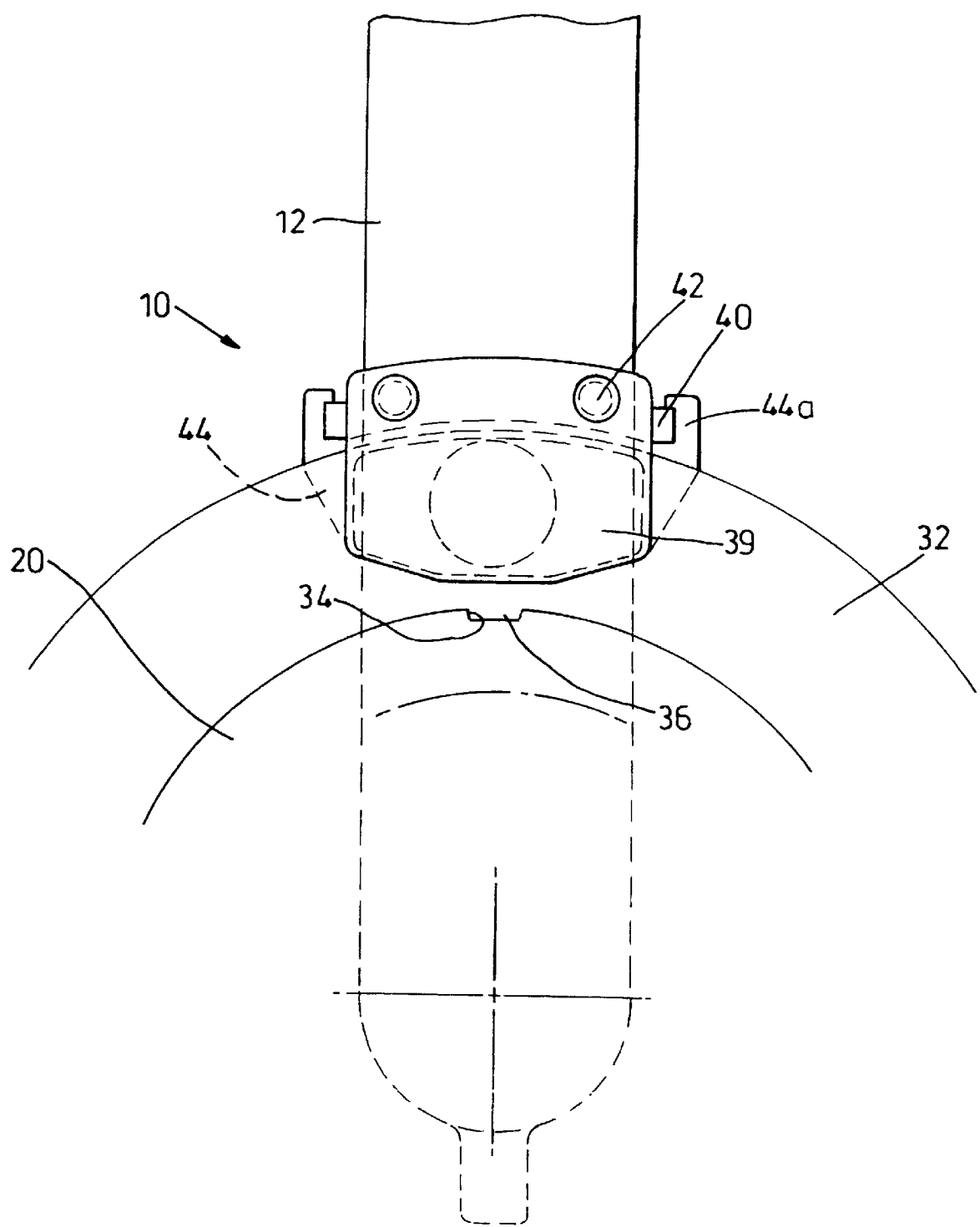
FIG. 2 is a view of a portion of the illustrative brake system taken in the direction of the arrow II in FIG. 1.
Figure 3:
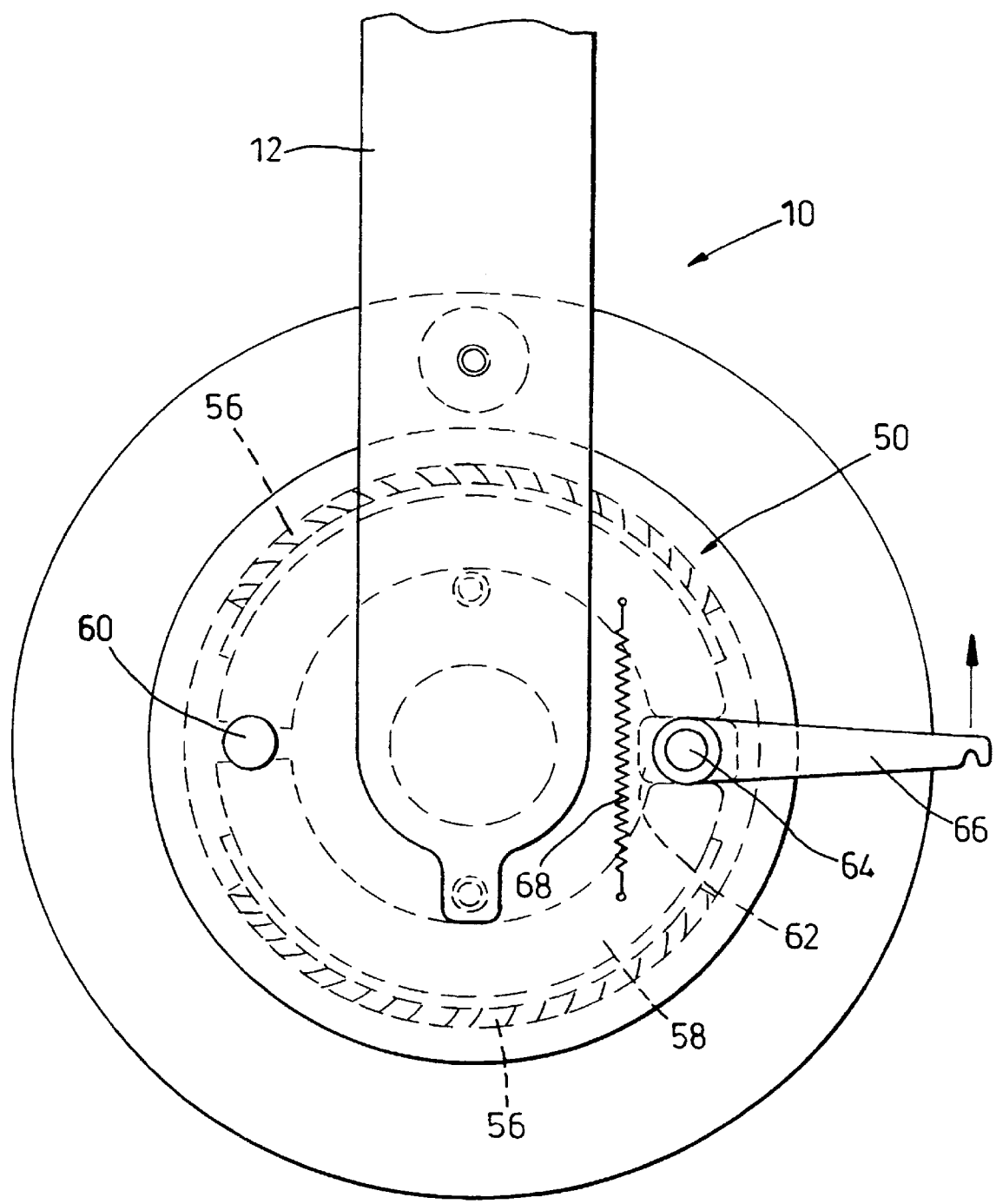
FIG. 3 is a view of a further portion of the illustrative brake system taken in the direction of the arrow III in FIG. 1.

The disc brake 30 also comprises friction material pads 38 which are mounted on both sides of each of the discs 32. There are four pads 38, these being an outer pad 38 which is mounted on an abutment 39 which is fixed relative to the link 12, two central pads 38 which are between the discs 32 and are mounted for axial movement, and an inner pad 38 (closest to the link 12) which is also mounted for axial movement. Specifically, a caliper 40 is secured to the mounting surface 12a of the link 12 by two bolts 42. The abutment 39 is secured to the caliper 40 by the bolts 42 and the central and inner pads 38 are mounted on supports 44 which are slidable on the outside surfaces of the caliper 40, the central pads 38 being mounted on opposite surfaces of the same support 44. Specifically, the supports 44 have hook-like projections 44a (see FIG. 2) which hook over side surfaces of the caliper 40 which, thus, provides a slideway extending axially.

The disc brake 30 also comprises an operating mechanism operable to bring the pads 38 into contact with the opposite surfaces of the discs 32 so that braking force is applied to the discs 32. The operating mechanism is provided by the aforementioned piston and cylinder assembly which comprises a piston 46 mounted in the recess 14 of the link 12, the recess 14 providing the cylinder of the assembly. The assembly also comprises a sealing ring 48 mounted in a groove in the wall of the recess 14 and engaging the outer surface of the piston 46. When hydraulic fluid under pressure is applied to the connection point 16, the piston 46 is urged out of the recess 14. The piston 46 engages the support 44 of the inner pad 38 and moves it along the caliper 40. The inner pad 38 then engages one of the discs 32 causing it to slide on the hub 20. This disc 32 then engages one of the central pads 38, causing the support 44 of both central pads 38 to move along the caliper 40. The other central pad 38 then engages the other disc 32 and moves it on the hub 20. This disc 32 then engages the fixed outer pad 38 when each disc 32 is engaged on both sides by a pad 38.

The illustrative brake system 10 also comprises a drum brake 50 arranged to serve as a parking brake to prevent rotation of the hub 20 when the brake 50 is applied. The drum brake 50 comprises a supporting plate 52 which is bolted to the mounting surface 12b of the link 12 by bolts 54, the plate 52 having a central hole through which the stub axle 18 passes. The drum brake 50 is positioned in the space between the portion 20a of the hub 20 and the internal cylindrical surface 20e of the mounting portion 20c of the hub 20. The drum brake 50 comprises two friction material shoes 56 which are arcuate having convex surfaces which face the surface 20e of the mounting portion 20c. The shoes 56 are mounted on arcuate supports 58 which are pivotal at one end thereof on a horizontal pin 60 supported by the plate 52. The other end of each of the supports 58 engages a cam 62 which is arranged to be turned about a horizontal pin 64 by operation of a lever 66. The pin 64 is supported by the plate 52 and the lever 66 projects through a space between the plate 52 and the mounting portion 20c of the hub 20. The supports 58 are arranged so that they leave sufficient space between them for the portion 20a of the hub 20. The cam 62 has a shorter radial extent which engages the supports 58 when the drum brake 50 is in an inoperative condition but, by operation of the lever 66, can be turned into an operative condition in which a larger radial extent of the cam 62 engages the supports 58. A spring 68 acts between the supports 58 to keep them in contact with the cam 62. In moving from the inoperative condition to the operative condition thereof, the cam 62 pivots the supports 58 about the pin 60, thereby moving the shoes 56 apart and into engagement with the surface 20e of the mounting portion 20c of the hub 20 so that the drum brake 50 acts as a parking brake.

What is claimed is:

1. A brake disc system comprising a disc brake, a drum brake, and a hub arranged to rotate about a central axis thereof, the hub comprising a mounting portion generally having the shape of a hollow cylinder centred on said axis, the disk brake comprising a disc mounted on an outer surface of said mounting portion of the hub for rotation with the hub, the disc also being mounted for axial sliding movement on the hub, wherein the drum brake comprises friction material shoes which are moveable into engagement with an internal cylindrical surface of said mounting portion of the hub to act as a parking brake, wherein the disc brake comprises an operating mechanism operable to cause friction material pads of the brake to engage both sides of said disc, the operating mechanism comprising a piston and cylinder assembly, the cylinder of which is formed integrally with a suspension link on which the hub is mounted.

2. A brake system according to claim 1, characterised in that said disc brake comprises two discs mounted on the same hub for rotation with the hub and for axial sliding movement on said hub.

3. A brake system according to claim 1, wherein the drum brake comprises two shoes of friction material pivotally mounted within the mounting portion of the hub.

4. A brake disc system according to claim 1, wherein said disc and said friction material shoes are arranged in radially opposed relation to one another on opposite sides of the hub.

\* \* \* \* \*